United States Patent
Rubin et al.

(10) Patent No.: US 6,421,195 B1
(45) Date of Patent: Jul. 16, 2002

(54) MAGNETIC DISK MEDIA WITH PATTERNED SECTIONS

(75) Inventors: Kurt Alan Rubin, Santa Clara; Bruce David Terris, Sunnyvale, both of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/399,008

(22) Filed: Sep. 20, 1999

(51) Int. Cl.$^7$ ................................................ G11B 5/09
(52) U.S. Cl. ........................ 360/48; 360/55; 360/135; 360/77.08; 360/77.03; 360/78.11
(58) Field of Search ...................... 360/55, 48, 131, 360/135, 77.08, 77.03, 78.11; 428/694 R, 694 TR, 694 BN (56) References Cited

U.S. PATENT DOCUMENTS

| | | | |
|---|---|---|---|
| 4,802,050 A | * 1/1989 | Miyabayashi et al. | ...... 360/135 |
| 4,935,278 A | 6/1990 | Krounbi et al. | |
| 4,948,703 A | 8/1990 | Falcone et al. | |
| 5,317,468 A | * 5/1994 | Wakabayashi et al. | ...... 360/135 |
| 5,571,591 A | 11/1996 | Brady et al. | |
| 5,772,905 A | 6/1998 | Chou | |
| 6,168,845 B1 | * 1/2001 | Fontana, Jr. et al. | ....... 428/65.5 |

OTHER PUBLICATIONS

"Imprint Lithography with 25–Nanometer Resolution", by Stephen Y. Chou et al, Science, vol. 272, pp. 86, 87, published Apr. 5, 1996.*

Chou, S., Patterned magnetic nanostructures and quantized magnetic disks, Proc. IEEE, 85(4), pp. 652–671, 1997.

Fernandez, A.,Magnetic force microscopy of single–domain cobalt dots patterned using Interference lithography, IEEE Trans. Mag., 32(5), pp. 4472–4474, 1996.

Krauss, P., Fabrication f planar quantum magnetic disk structure using electron beam litho–Graphy, reactive ion etching, and chemical mechanical polishing, J. Vac. Sci. Tech., 13(6) pp. 2850–2852, 1995.

Bajorek, G., magnetically discrete but physically continuous recording tracks, IBM Tech. Disclosure Bulletin, 18(5), pp. 1641–1642, 1975.

\* cited by examiner

Primary Examiner—Alan T. Faber
(74) Attorney, Agent, or Firm—Lumen Intellectual Property Services (57) ABSTRACT

A magnetic disk medium patterned linear magnetic channels in a radial direction of the disk is employed in a magnetic disk drive unit. The magnetic channels are patterned by high-resolution patterning techniques and are separated by channel boundaries to reduce magnetic coupling between the magnetic channel. The lithographically determined magnetic channel widths are matched with the head width to optimize the storage capability of the disk drive unit. The magnetic medium is further patterned into spatially modulated sections that provide for an inherent servo-signal that reduces or eliminates the need for pre-recorded servo data.

38 Claims, 10 Drawing Sheets

Radial Frequency of Spatially Modulated Pattern Section

MAGNETIC DISK MEDIA WITH PATTERNED SECTIONS

FIELD OF THE INVENTION

This invention relates to information storage systems that use magnetic disk media. More particularly, the invention relates to a disk drive that uses patterned magnetic disk media.

BACKGROUND

Magnetic recording disks are typically produced by depositing a thin magnetic recording layer on a suitable disk substrate. Data is generally written on the magnetic layer by a recording head that writes magnetic data bits in the magnetic layer while scanning the surface of the disk. To increase the magnetic recording density of the magnetic disk, the bit sizes in the magnetic layer need to be as small as possible.

Magnetic bit volumes in conventional crystalline magnetic media may include hundreds of magnetic grains or sets of grains. Grains and/or sets of grains are often surrounded by segregating materials that separate neighboring grains and reduce exchange-based magnetic coupling. In order to increase the areal density of disk drives the surface accessible dimensions of magnetic bit volumes must be reduced. This can generally be accomplished by reducing the average grain size while maintaining a critical number of grains in each bit volume to obtain adequate signal to noise ratios.

Depositing thinner magnetic layers often results in smaller grains and potentially higher areal densities of disk drives. However, it is well known in the art that a limiting factor for reducing the average grain size in a magnetic recording layer is the onset of superparamagnetism. This situation arises when the magnetic volumes of grains or groups of grains are thermally unstable, either at room temperature or at elevated temperatures. A magnetic layer with a large number of superparamagnetic magnetic grains is incapable of storing magnetic data for long periods of time.

Instead of reducing bit sizes by reducing the grain sizes, it has been suggested that patterning methods can be used to define bit boundaries and increase the bit densities of magnetic media. An early example of patterning magnetic media in a circumferential direction is disclosed in IBM Technical Disclosure Bulletin, Vol. 18 No. 15 October 1975, where a layer of a medium is patterned with circumferential magnetic and non-magnetic tracks alternating at different radial positions of a disk medium. Radial position, herein, denotes a position on a disk medium relative to the center the disk and radial direction refers to a direction that extends either inward or outward and that is substantially normal to a circumferential track. Circumferential position refers to a position along a circumferential track and circumferential direction refers a direction that extends along or follows a circumferential track.

Patterning a magnetic disk medium with magnetic and non-magnetic circumferential tracks results in sharp circumferential boundary definitions that can result in improved magnetic transitions. Further, because the magnetic circumferential tracks are separated by non-magnetic circumferential tracks, edge anomalies and cross-talk between data bits located in adjacent tracks is reduced. Other examples of patterning magnetic layers with circumferential recording tracks are described by Brady et al., in U.S. Pat. No. 5,571,591, and by Krounbi et al., in U.S. Pat. No. 4,935,278.

Patterning magnetic media in two-dimensions to form small isolated magnetic islands has also been described. For example, Fernandez et al. characterize isolated Co magnetic domains in "Magnetic Force Microscopy of Single-Domain Cobalt Dots Patterned Using Interference Lithography", IEEE Trans. Mag., Vol. 32, pp. 4472–4474, 1996. By using interference lithography to pattern a resist coated silicon wafer followed by thermal evaporation of Co, isolated arrays of magnetic Co domains are generated. Krauss et al. in "Fabrication of Planar Quantum Magnetic Disk Structure Using Electron Beam Lithography, Reactive Ion Etching, and Chemical Mechanical polishing" J. Vac. Sci. Technol. B 13(6), pp. 2850–2852, Nov/Dec 1995, describe an etching processes to define domains followed by an electroplating step to isolate magnetic Ni domains.

Other methods of two-dimensional patterning of magnetic media are disclosed by Falcone et al., in U.S. Pat. No. 4,948,703. Falcone et al. describe a method of embossing a photo-polymer to pattern the surface of an optical disk and Chou et al., in "Imprint Lithography with 25-Nanometer Resolution", Science, Vol. 275, Apr. 5, 1996, and U.S. Pat. No. 5,772,905 describes a method for embossing PMMA at elevated temperatures and pressures with a template to achieve high resolution patterning. Chou in "Patterned Magnetic Nanostructures and Quantized Magnetic Disks", Proc. IEEE, Vol. 85, No 4, pp. 652–671, April 1997, further describes a method for making magnetic domains with ferromagnetic materials such as cobalt or nickel by electroplating a PMMA embossed surface. The magnetic material fills the depressions in the embossed PMMA surface and creates small magnetic domains.

The Methods of patterning magnetic media with circumferential tracks, described above, fail to take advantage of high-resolution optical techniques for patterning, such as optical interference lithography, which can rapidly pattern an entire disk. This is because optical interference lithography has a technical limitation of primarily being useful to perform patterning with linear dimensions and is an extremely difficult technique to adapt for creating patterns with curvature, such as is needed for circular or circumferential tracks.

One of the shortcomings of using optical interference lithography to pattern a medium in two dimensions is that it requires that the medium be patterned in a two step process. For example, in using optical interference lithography to pattern a magnetic medium, a first patterning step is performed to pattern the medium with a first set of linear patterning lines. Subsequently, in a second patterning step, a second set of linear patterning lines are made on the medium, preferably with the second set of lines extending in a direction orthogonal to the first set of patterning lines. The two step patterning process produces small magnetic islands that define the boundaries of the magnetic bits. Unfortunately, the process of patterning a second set of lines on the surface of a magnetic medium can alter the dimensions of the bits in the direction used during the first patterning step, thus introducing inconsistencies in the patterning process from disk-to-disk. These inconsistencies in bit dimensions from disk-to-disk make it difficult to consistently match the dimensions of a read head and write head to the bit dimensions. Therefore, to achieve good matching between bit and head dimensions, the head and bit sizes of a medium pattered by this method must be individually matched for each magnetic data storage system produced.

There are several advantages to patterning magnetic media. As already mentioned the well-defined boundaries of patterned bits can reduce cross talk between adjacent bits and provide sharper magnetic transition within the bits. Also, there is a potential to greatly increase the areal bit density by reducing the bit surface dimensions. Theoretically, pattering may be used to define very small individual bits that have sufficient magnetic volumes to be thermally stable.

Ideally, a magnetic disk storage system includes a patterned magnetic disk with bits which have patterned boundary dimensions closely and consistently matched with the dimensions of the read and write head. If the bits of the magnetic disk medium have dimensions that are smaller than the dimensions of the read sensor width, signal is lost. On the other hand, if the magnetic disk medium has bit dimensions that are larger than the dimensions of the write pole tip or read sensor width, the storage density of the magnetic medium is not fully utilized. Further, head/bit matching needs to reproducible from data storage system to data storage system.

A third shortcoming of magnetic storage systems and magnetic disk media disclosed in the prior art is that disk media require servo data to be pre-recorded on the disks. The pre-recorded servo data is used in the magnetic storage systems to locate and position read and write devices near surfaces of the magnetic media. Writing magnetic servo-data requires costly equipment and adds a significant amount of time to the manufacturing process of disk media.

What is needed is a magnetic data storage system with patterned magnetic disk medium that has bit dimensions, which are defined by patterning and that are easily matched to the dimensions of a read and write device. The magnetic medium is preferably patterned using high-resolution interference lithographic techniques so that rapid, high-resolution patterning is achieved and so that a mask is not required. It is further desirable that the patterned magnetic medium reduce or eliminate the need to pre-record servo-data on the medium.

OBJECTS AND ADVANTAGES

Accordingly, it is a primary object of the present invention to provide a magnetic disk medium that is patterned with linear magnetic channels for storing magnetic data. The linear patterning provides for data bits to have sharp edge definitions, which provide for improved magnetic transitions within data bits.

It is a further object of the present invention to provide a magnetic disk medium patterned with magnetic channels extending substantially in a radial direction relative to the center of the disk. This arrangement of linear magnetic channels provides for easy matching of bit dimensions with the dimensions of the read and write head. The matching of the head pole tip dimensions to the bit dimensions in the radial direction maximizes the storage capabilities a disk drive unit and optimizes the data signal generated from data bits within the disk medium. It also allows each disk surface to be formatted optimally for the particular head dedicated to that surface, again providing for maximum compactness of the head/disk combination.

It is a further object of the present invention to provide a magnetic disk medium that is patterned with linear magnetic channels extending in a substantially radial direction and which are patterned by high resolution optical interference lithography. High-resolution optical interference lithography does not require a mask for patterning and, thereby, simplifies the disk manufacturing process.

It is yet another object of the present invention to provide a magnetic disk medium, which is patterned into spatially modulated sections. The spatially modulated sections provide an inherent servo signal that is used in a servo-tracking system for locating and positioning the read and write head. The inherent servo signal generated by the spatial modulation of patterned sections reduces or eliminates the need for writing pre-recorded servo data on the disk medium and thus reduces disk-manufacturing costs.

The disk medium of the current invention enjoys the benefits of a patterned magnetic disk medium and is capable of being used in a variety of disk drive systems with varying radial pole-tip widths.

SUMMARY

The objects and advantages of the invention are achieved by providing a disk medium that is patterned with linear channels extending in a radial direction of the disk. The magnetic channels are separated by channel boundaries that prevent or reduce magnetic coupling between the magnetic channels. The linear magnetic channels may be patterned by any patterning method, but are preferably patterned by a photo-lithographic technique such as interference lithography. Interference lithography has an advantage over alternative patterning methods because it does not require a patterning mask.

The magnetic disk medium has a magnetic layer that is preferably a Co alloy magnetic layer 1.0 to 500 nanometers thick and is deposited on a suitable disk substrate. Suitable disk substrates include, but are not limited to, disk substrates of a aluminum-magnesium alloy with a coating of nickel phosphorus, glass, silicon, ceramic or quartz. The magnetic layer is more preferably a Co alloy with Cr in the range of 0 to 30 atomic percent, Fe in the range of 0 to 40 atomic percent and Pt in the range of 0 to 80 atomic percent. Most preferably, the magnetic recording layer also contains B in a range from 0 to less than or equal to 25 atomic percent. The magnetic layer is generally coated with a protective carbon top coat to prevent oxidation and degradation of the magnetic layer.

This invention can be utilized to pattern magnetic disk layers with the easy magnetization axis orientated either in the conventional longitudinal (parallel to the disk) or perpendicular to the disk and can be used to pattern either crystalline or amorphous magnetic layers.

A magnetic disk drive that employs the patterned magnetic medium of the current invention may be connected to a data input unit. The input unit may include any input devices known in the art, such as a computer and/or a microprocessor. The microprocessor, for example, receives input instructions or data through a keyboard a voice activated program or any of the numerous means for inputting data known in the art. The input data is transferred to a disk drive unit with a read and write head, which scans the disk medium in a circumferential direction and writes magnetic data bits in the patterned magnetic channels. The disk drive unit also has a servo positioning system for systematically locating and positioning the read and write head. The servo positioning system reads servo marks positioned at predetermined locations on the disk medium. The servo marks are preferably magnetic servo-marks, but may also be optical servo marks.

Figure 9:
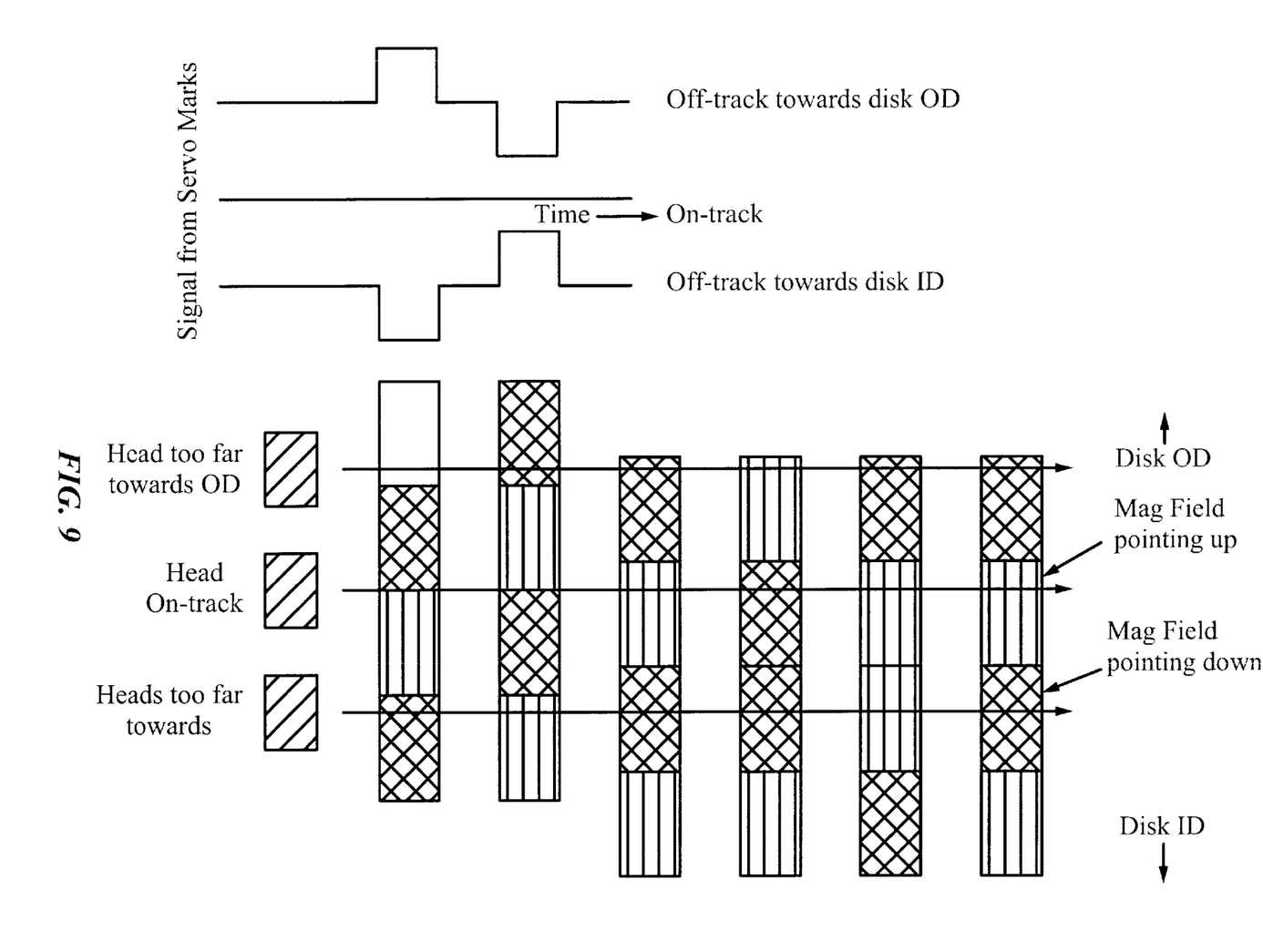
FIG. 9 illustrates an example of a servo system in which magnetic marks are written in the first two channels and the difference in amplitude from those two channels is used to generate a servo signal.

In a particular embodiment of the current invention, the magnetic disk medium is patterned into spatially modulated sections. The sections are further patterned with linear magnetic channels separated by channel boundaries. Both the magnetic channels and channel boundaries are parallel to each other within each patterned section. A soft sector pattern is written in two or more channels using the write head to produce magnetic marks that are offset in a radial direction by 50% of the track pitch with respect to the data marks, as shown in FIG. 9. The spatial modulation of the magnetic patterned sections provides a means to generate a servo-signal used by the servo positioning system to locate and position a read and write head during a scanning operation. In addition, the end of one patterned wedge and the beginning of the next can act as a sync mark to allow the drive to know when a new wedge has started. Once that sync mark is detected the drive looks for the soft-sector pattern which is used to generate a feedback signal to control radial positioning of the read and write head.

In the present invention, the data bits within the disk medium are defined in a substantially circumferential direction by the linear edges of the patterned magnetic channels and are defined in a substantially radial direction by a width of the read and write head. In this invention, a write-head refers to any type of head capable of writing marks. In particular, it refers to a ring head or a pole head. In FIG. 5, a ring head is shown, which is useable for both longitudinal or perpendicular recording, but a pole head may also be used for perpendicular recording. The read element is not shown in the figures, but could be a spin-valve, an MR-sensor, a tunnel junction or an inductive read head, for example. It is advantageous to precisely match dimensions of data bits with the dimensions of the read and write head to maximize the storage capabilities of the disk medium. The lithographic processes currently used in the art to define widths of head pole-tips in the radial direction are not as controllable and reproducible as the thin film deposition process that define thicknesses of the pole tips in a circumferential scanning direction.

Matching the circumferential scanning thickness of the pole tip with precise lithographic patterning of magnetic channels in the radial direction can be accomplished consistently. By defining the track pitch with the less well controlled radial read and write head widths, each head/disk can be independently formatted with a different track pitch. In this way the magnetic storage system of the current invention enjoys the benefits of a patterned magnetic disk medium and overcomes the difficulties associated with matching bit dimensions to the dimensions of pole-tips.

DETAILED DESCRIPTION

Figure 1:
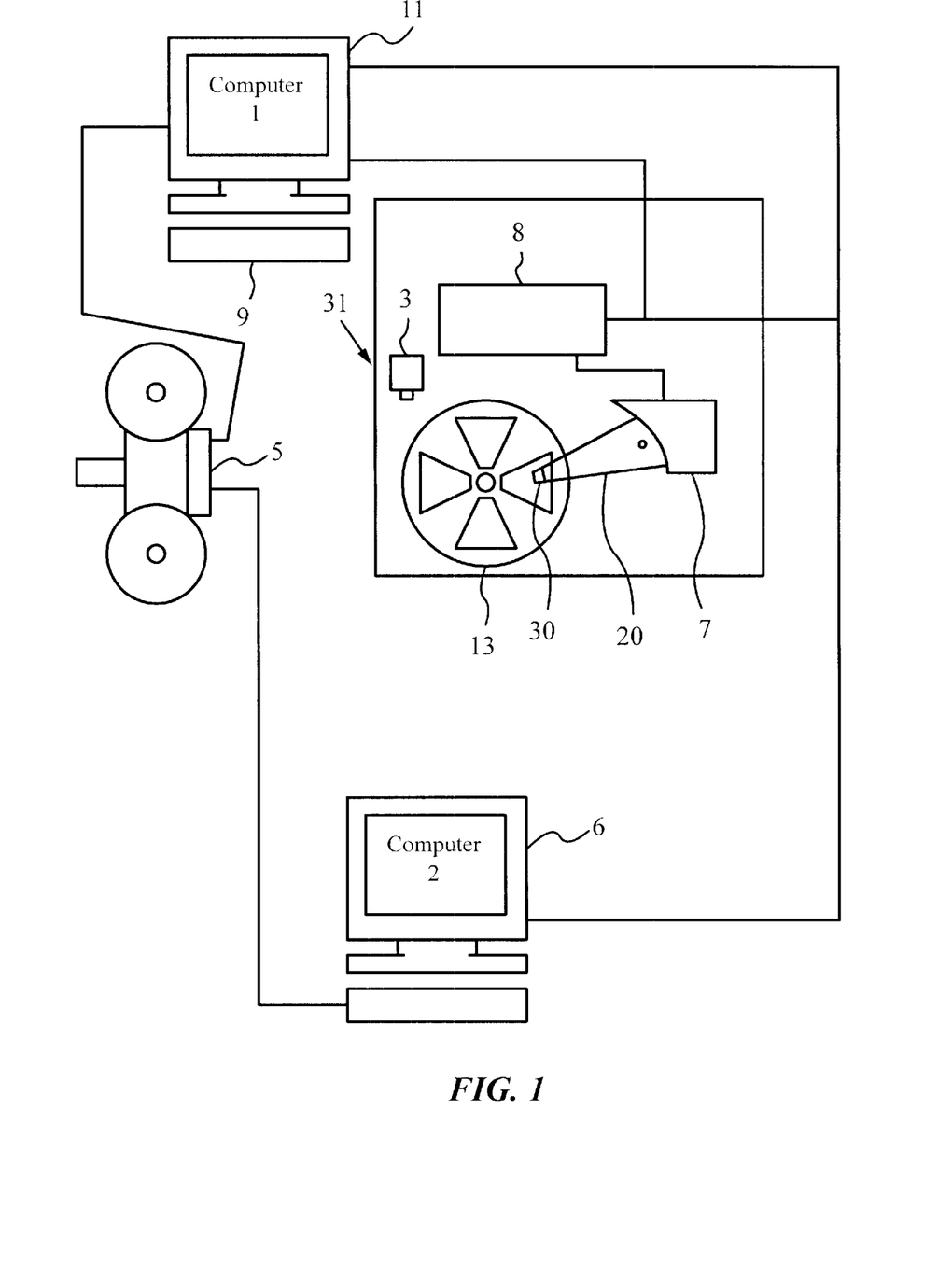
FIG. 1 is a magnetic data storage system configured according to the current invention with a magnetic disk medium patterned in sections.

FIG. 1 shows a typical configuration for a data storage system with a disk drive unit 31 that employs a patterned magnetic medium 13 of the current invention. The data storage system has an input unit 11 that is preferably a microprocessor unit or computer that is in communication with disk drive unit 31. The input unit receives data from an input device 9, that may be any arbitrary input device known in the art such as a keyboard, a microphone, a voice activated program, an optical device 5 or any other obvious variation thereof. The input unit 11 transfers input data to the disk drive unit 31 where a writing head 30 writes data bits on the patterned medium 13 during a scanning operation. In a preferred embodiment of the invention the head 30 is also an integrated read and write head, that is capable of reading data bits stored in the medium 13 during a scanning operation.

The disk drive unit 31 preferably has a servo positioning system for systematically locating and positioning the read and write head 30. The servo positioning system includes servo marks (not shown) located at predetermined positions on the medium 13 and the head 30 reads the servo marks to produce a servo signal. The servo signal provides information about the position and location of the head 30 to the servo feedback unit 8. Preferably, the servo marks are magnetic servo marks but may also be optical servo marks sensed by an optical sensing unit 3.

Read and write head 30, of the disk drive unit 31, is preferably attached to a movable actuator arm 20. Movable arm 20 is further connected to an arm drive unit 7 capable of moving the read and write head 30 to various positions over the disk medium 13. The disk drive unit 31 may also include a servo feedback unit 8 that processes servo data and monitors positions and locations of the read and write head 30 during scanning operations. The read and write head 30 is scanned over an air bearing surface of the patterned medium 13 in a circumferential direction. This can be accomplished by rotating the disk medium 13 about its center.

Figure 2:
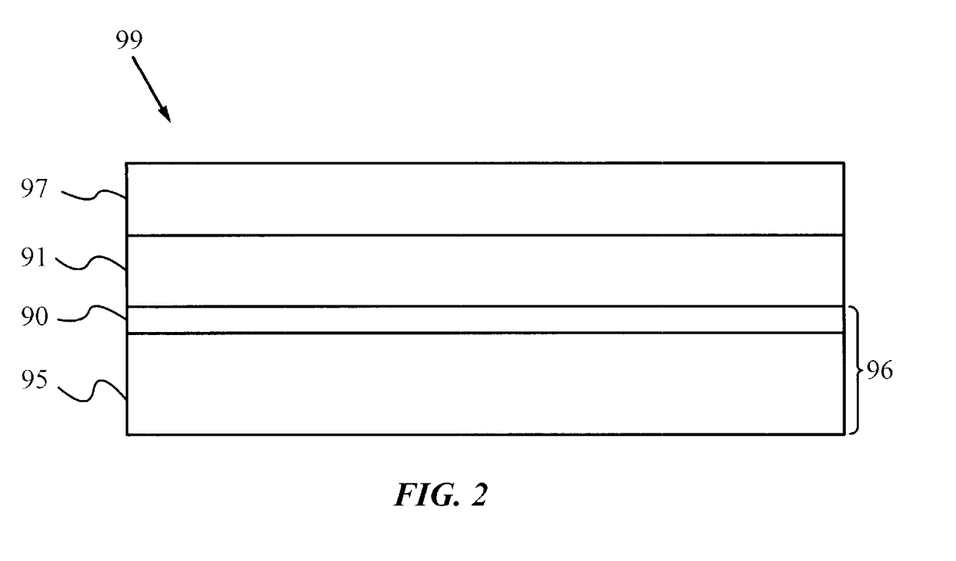
FIG. 2 is a cross-sectional view of the layered magnetic structure of a magnetic disk medium with patterned sections.

FIG. 2 shows a cross-sectional view of a magnetic disk structure 99 as can be used in disk medium 13 of the current invention. The magnetic structure 99 has a magnetic layer 91. The magnetic 91 layer is preferably a Co alloy layer that is 1.0 to 500 nanometers thick and is deposited on a suitably prepared disk substrate 96. Suitably prepared disk substrates 96 include, but are not limited to, substrates 95 of aluminum-magnesium alloy with a nickel phosphorus coating, glass, silicon, ceramic and quartz coated with a thin preparatory layer 90. The preferred preparatory layer 90 depends on the substrate 96 and the magnetic material to be subsequently deposited. Typically, substrates are prepared by depositing a thin layer of Cr or Cr based alloy on the substrate 96 prior to depositing the thicker magnetic layer 91. The magnetic layer 91 is preferably a Co alloy with Cr in the range of 0 to 30 atomic percent, Fe in the range of 0 to 40 atomic percent and Pt in the range of 0 to 80. Most preferably, the magnetic layer 91 also contains B in a range of greater than 0 to less than or equal to 25 atomic percent. The magnetic layer 91 is generally coated with a protective carbon topcoat 97 to prevent oxidation and degradation of the magnetic layer.

Figure 3:
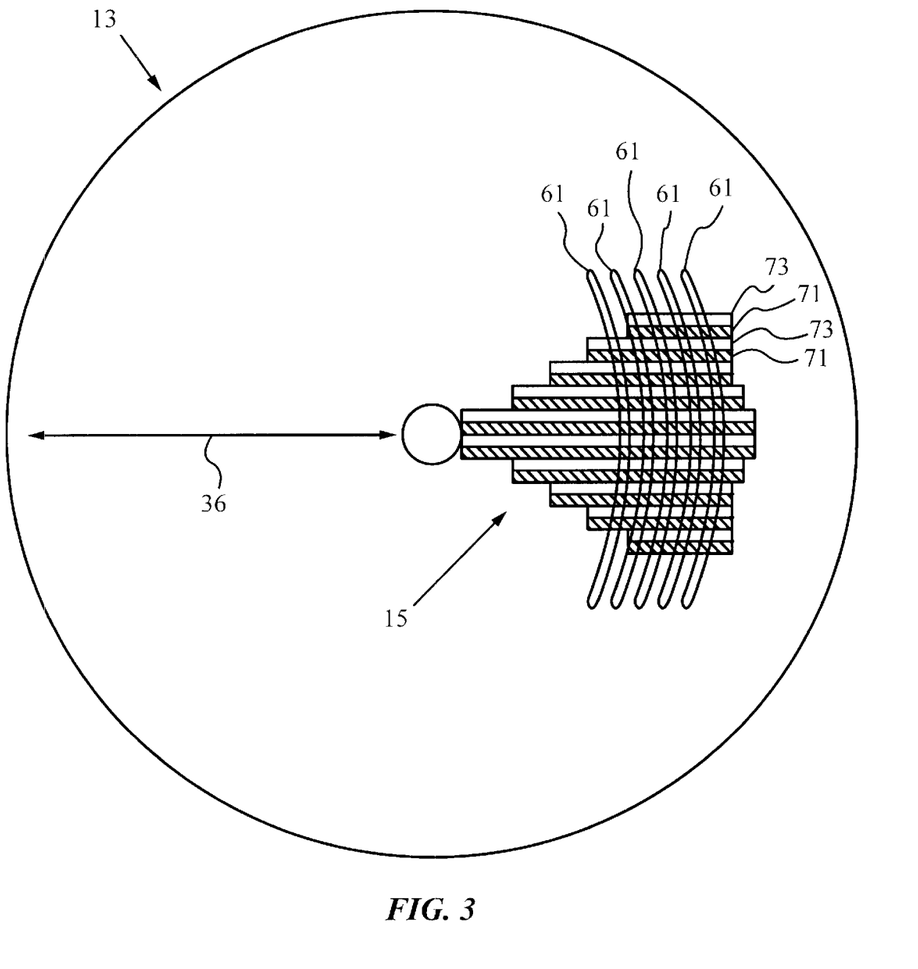
FIG. 3 is a patterned section of a magnetic disk medium according to the present invention indicating a circumferential direction and position of circumferential tracks.

FIG. 3 shows a patterned section 15 of the magnetic disk medium 13 of the current invention. The patterned section 15 is patterned with linear channels 73/71, one of which extends substantially in a radial direction 36 of the magnetic disk medium 13. The other linear channels within that patterned section are parallel to the channel that is oriented radially from the disk center. Within the patterned section 15, there are magnetic channels 73 used for storing magnetic data. The magnetic channels 73 are separated by channel boundaries 71. Preferably the channel boundaries 71 are non-magnetic, but may also be magnetic channel boundaries with substantially different magnetic properties from those of the magnetic channels 73. The magnetic channels 73 and channel boundaries 71 are preferably parallel to one another. Further, the channels and boundaries 73/71 are preferably positioned within a section 15 such that circumferential tracking paths 61 of a magnetic read or write device, such as read and write head 30 are substantially perpendicular to the radial direction 36.

Figure 4A:
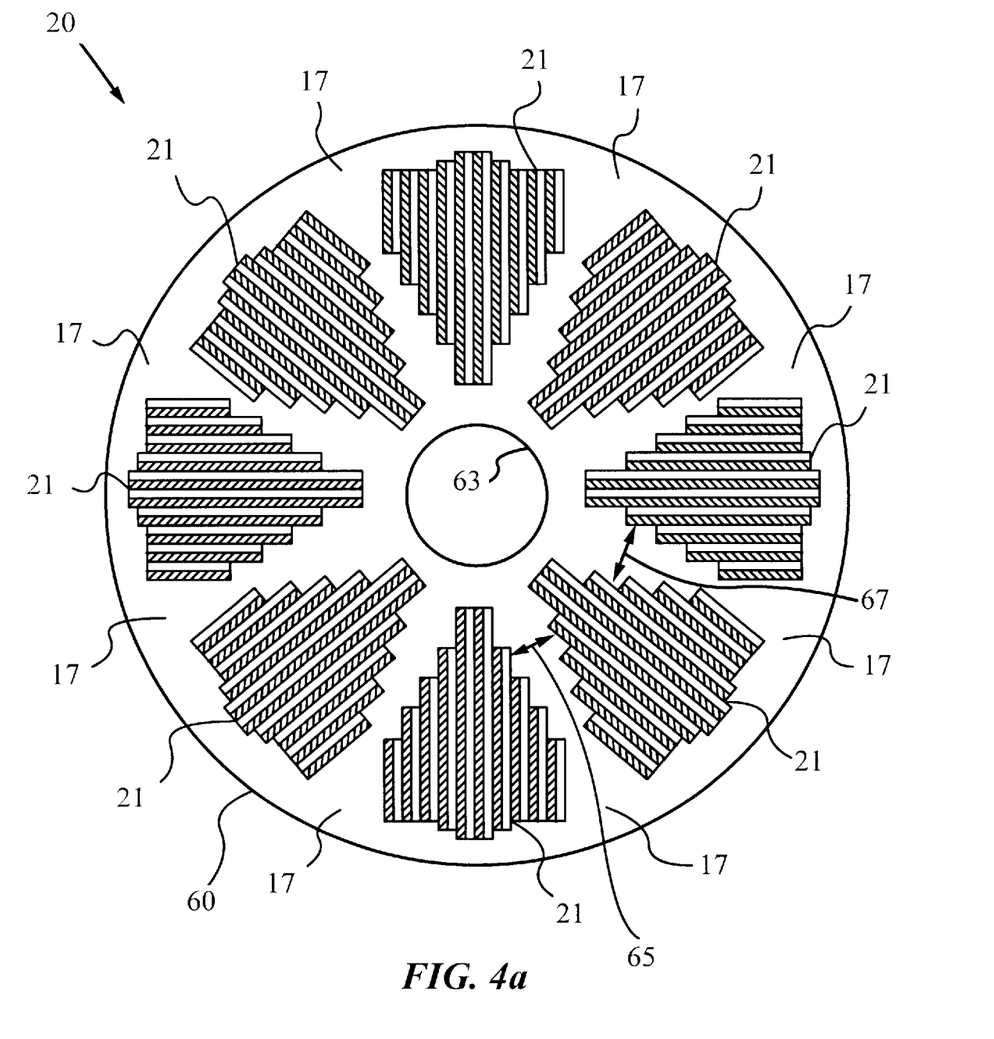
FIG. 4a is a magnetic disk medium with spatially modulated patterned sections according to the present invention.

Now referring to FIG. 4a, a patterned magnetic disk medium 20 in accordance with the most preferred embodiment of the present invention is illustrated. Obviously, magnetic disk medium 20 can be used as magnetic disk medium 13 in the data storage system of FIG. 1. The disk medium 20 with an inside diameter 63 and an outside diameter 60 is patterned with sections 21 that are spatially separated by a boundary material 17. The boundary material 17 has magnetic or optical properties that are substantially different from the material comprising the magnetic channels. In a particular embodiment of the current invention the patterned sections 21 are wedge shaped sections and are spatially modulated by section spacing distances 65 and 67. The measured section spacing distances 65 and 67 indicate a radial location on the disk 20. The spatial modulation of the sections 21 is measured or detected by a servo-tracking system (not shown) that provides a servo-tracking signal used to locate and position a read or write device, such as the read/write head 30 shown in FIG. 1.

Figure 4B:
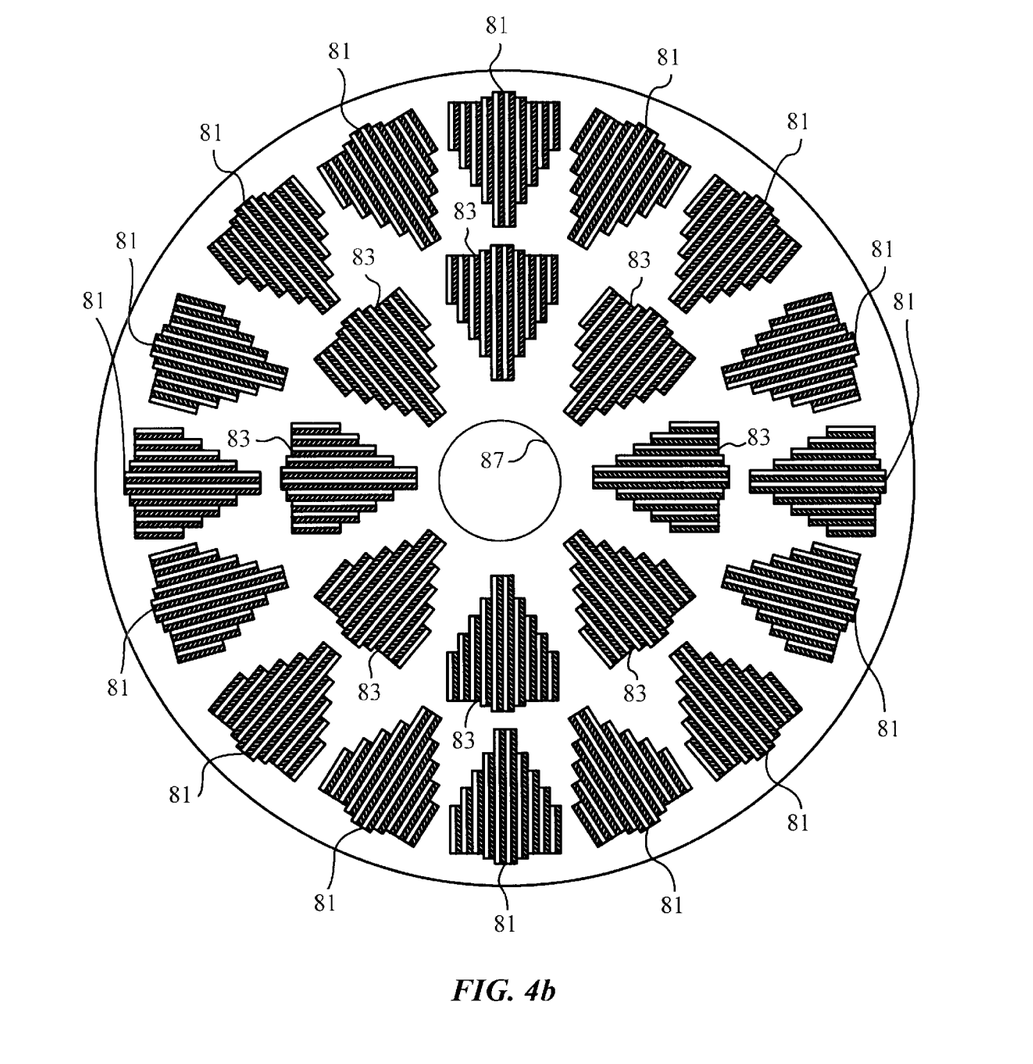
FIG. 4b illustrates spatial modulation of patterned magnetic sections on a magnetic disk medium in which the sections are arranged in a series of concentric bands.

FIG. 4b shows an alternative embodiment of the current invention. A disk medium 80 is patterned with wedges, similar to those described in FIG. 4a, but which are arranged in a series of concentric bands, wherein each band contains a plurality of patterned wedges. For example, patterned wedges 81 form an outer band that borders the outer diameter 85 of the disk medium 80, while the patterned wedges 83 form an inner band that borders the inner diameter 87 of the disk medium 80. While two bands of patterned wedges are shown in FIG. 4b, any number of bands of patterned wedges are considered to be within the scope of the current invention. Further, the number and positions of patterned wedges that are within bands may be varied in many ways. It is beneficial, for example to have a greater number of patterned wedges in the band bordering outer regions of the disk medium 80, because this configuration allows for a higher frequency of servo marks (not shown) and allows for better tracking to occur at the higher linear speeds generally observed at these outer regions of the disk medium 80.

Figure 5A:
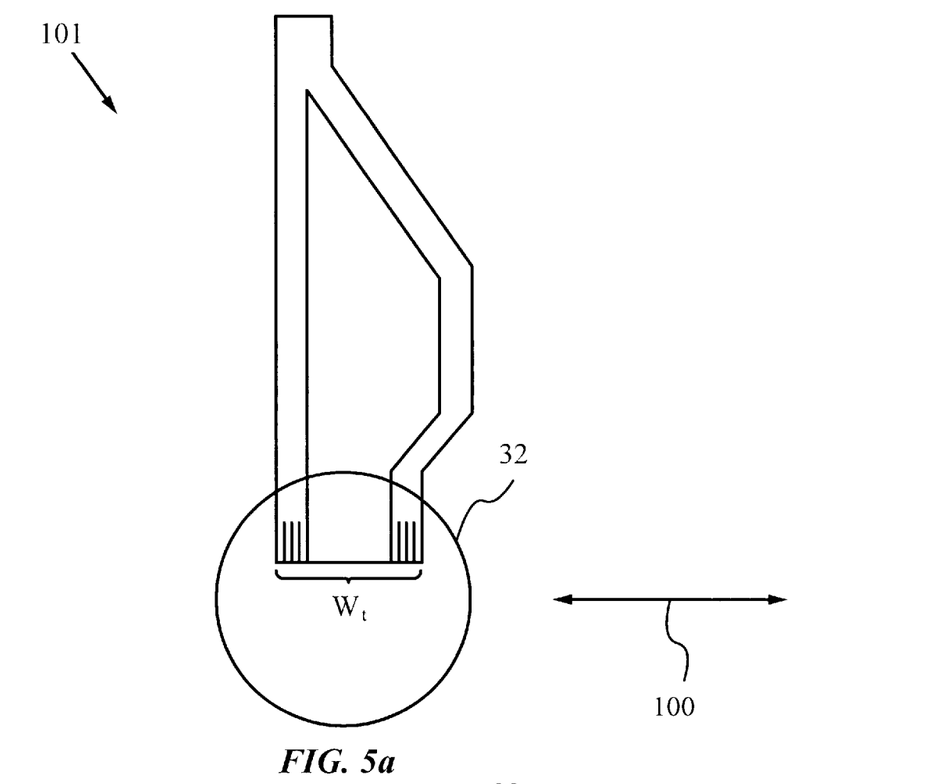
FIGS. 5a–b is a yoke portion of a read and write head device illustrating the circumferential width and the radial width of the device and its relative circumferential tracking direction in the magnetic storage system of the current invention.
Figure 5B:
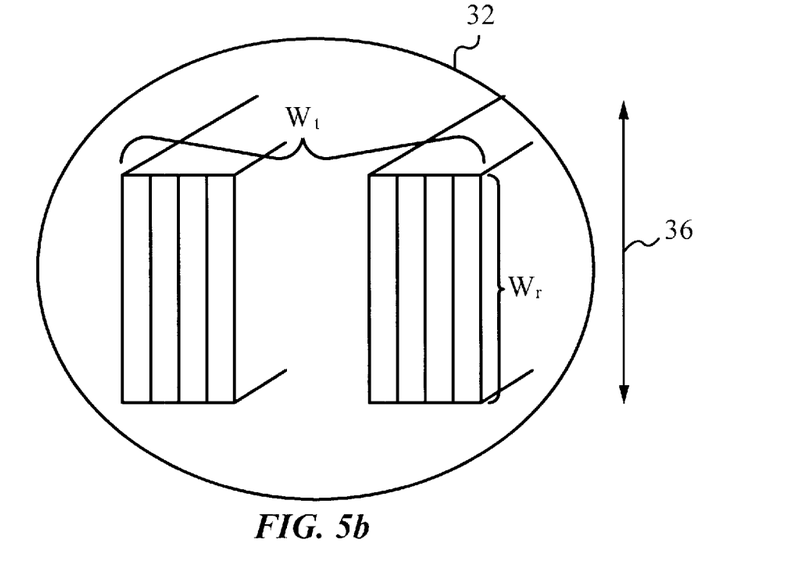

FIG. 5a shows a portion of a yoke 101 for a typical write device. In this case yoke 101 belongs to head 30. The circumferential scanning direction of the device along an air-bearing surface of magnetic disk medium 13 is indicated by arrow 100. FIG. 5b illustrates an enlarged perspective view of the head pole-tip 32. The direction 36 corresponds to a radial direction of a magnetic disk medium and direction 100, again, corresponds to a circumferential scanning direction of the device over an air-bearing surface of the magnetic disk medium 13. The bit dimensions in the circumferential direction, corresponding to direction 100, are determined by the lithography process used to form the channels. The radial bit dimensions, corresponding to direction 36, in the magnetic disk medium are determined by the width Wr of the write pole-tip 32. This provides for good matching of magnetic bit dimensions with pole-tip 32 of read and write head 30. The lithographic processes currently used in the art to define the widths Wr of the pole tips are not as reproducible as the deposition processes that define the thickness Wt and gap Wg of the pole tips. Thus, matching the thickness Wt and gap wg of the pole tip with precise lithographic patterning of linear magnetic channels in the circumferential direction can be achieved consistently for each disk drive unit that employs a disk medium patterned according to the invention.

Figure 6:
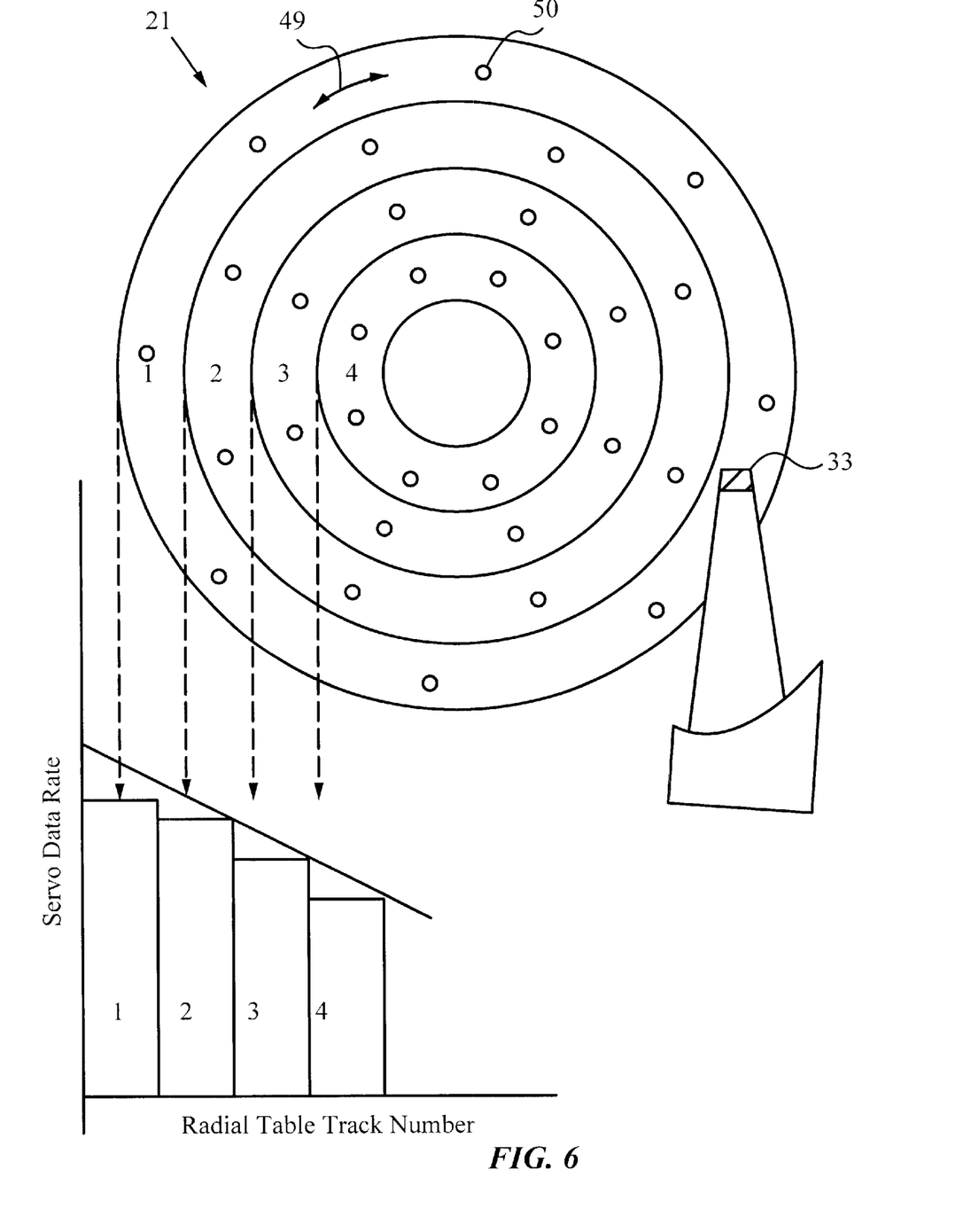
FIG. 6 graphs a rate of regularly spaced longitudinal magnetic servo data sensed by a magnetic reading device versus circumferential tracks for a magnetic disk medium spinning at a constant spin rate.

FIG. 6 illustrates a method of servoing using magnetically written servo marks. The generated servo data from servo marks 50 can be used in a servo-tracking system to determine a radial location of a head 33 over a disk medium 21 in is accordance with the invention. In one embodiment, equally spaced servo marks 50 are located in a tangential/circumferential direction 49 along each track 1–4. Because the rate at which the surface will pass under a stationary head is greater for a track that is at radial positions farther from the center of the disk medium, the rate of data sensed is also faster. For example, the number of servo marks that are sensed in any given time frame will be greater in track 1 than the number of servo marks sensed in track 4 for the same time period. The sensed servo information can be used in a servo-tracking system to determine a location of a sensing device near an bearing surface of the disk medium.

Figure 7:
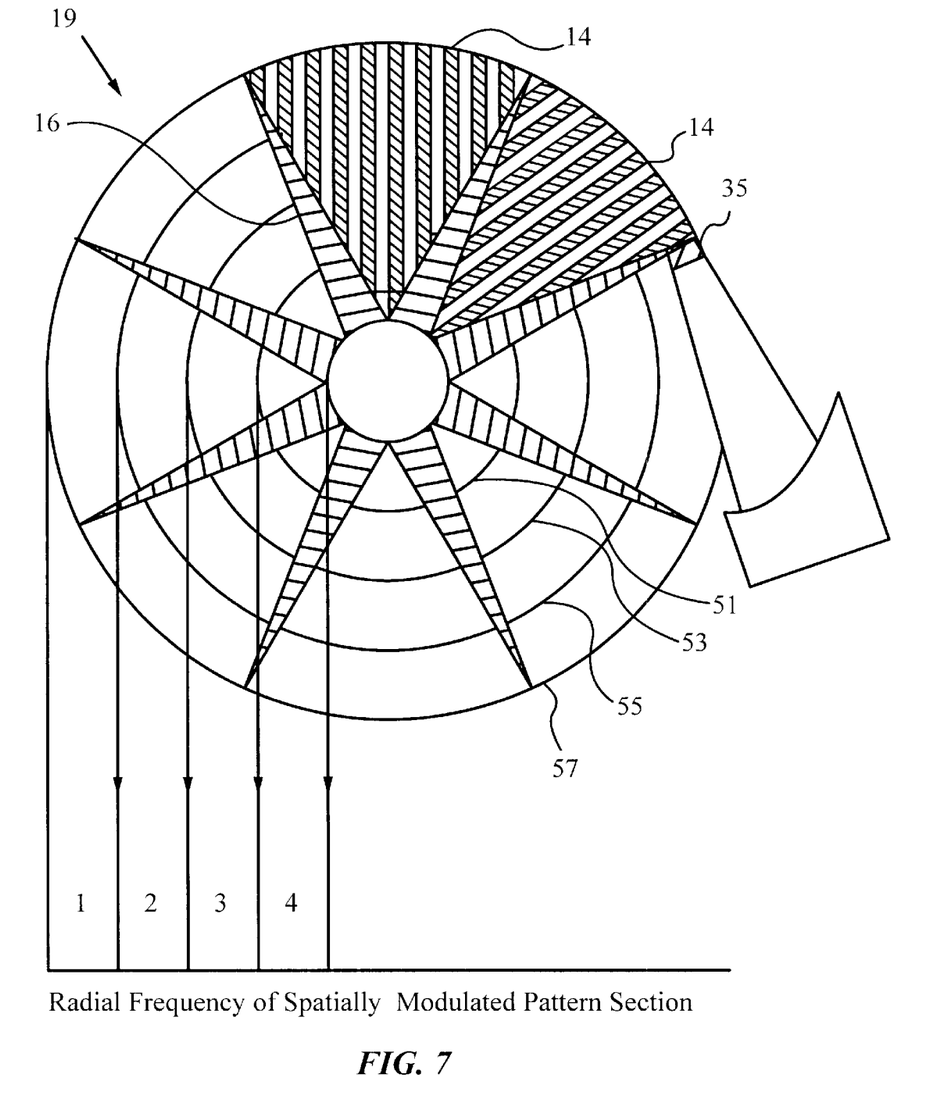
FIG. 7 illustrates spatial modulation of patterned magnetic sections on a magnetic disk medium according to the present invention.

FIG. 7 illustrates a preferred embodiment of a disk medium 19. The medium 19 is patterned with sections 14 that are spatially modulated (only two sections are shown for clarity). A spacing 16 between each patterned section 14 depends on the circumferential track position of the disk (51–57). A head 35 senses the distance between the patterned sections 14 and generates an inherent servo-signal. The inherent servo-signal may then be used in servo-tracking system to determine the tracking position of a read and write head 35.

Figure 8:
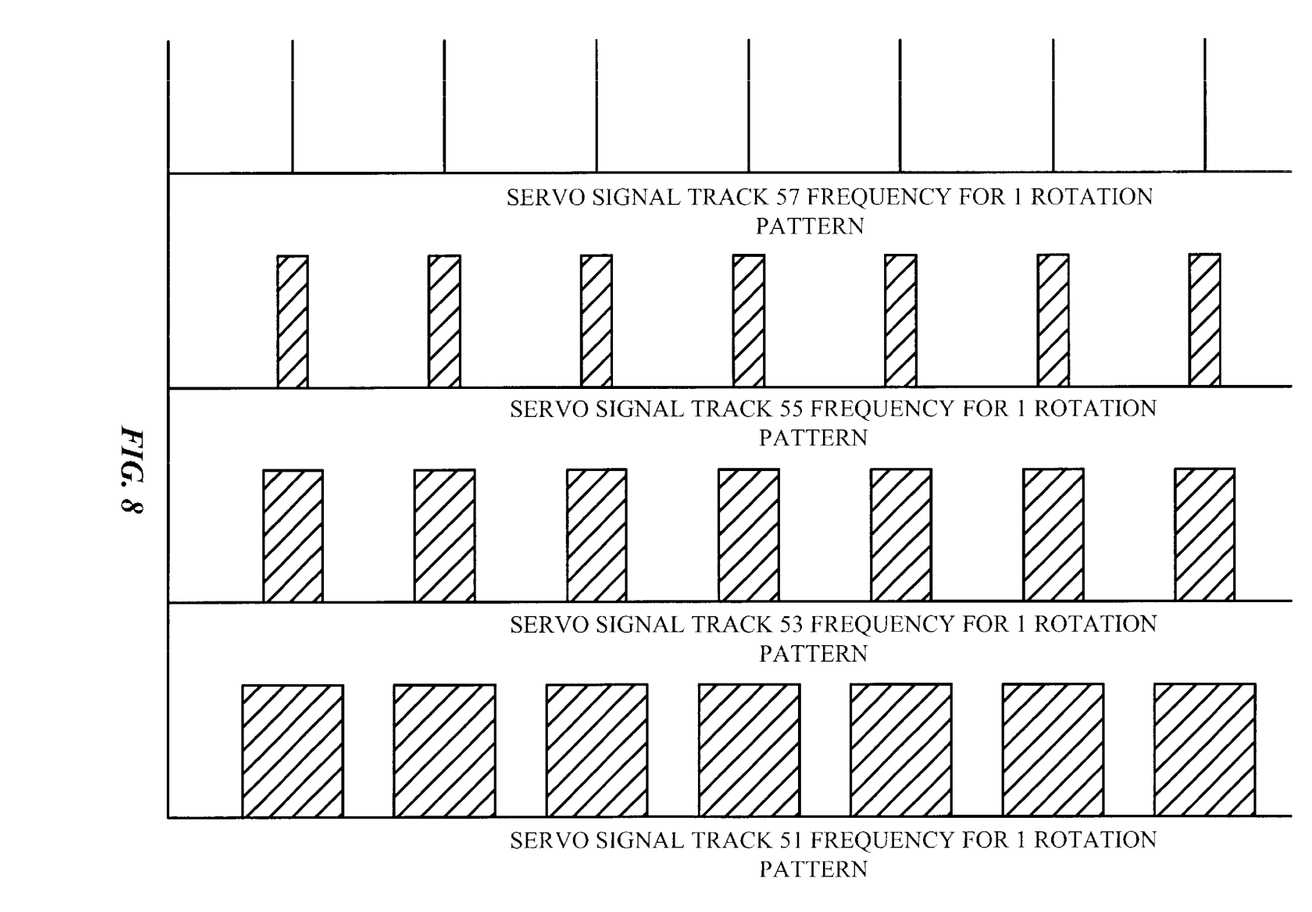
FIG. 8 displays a servo signal generated by spatially modulated patterned magnetic sections on a disk medium made in accordance with the current invention.

FIG. 8 illustrates an exemplary servo-tracking signal generated by a disk medium patterned with spatially modulated sections. In this example, the spaces between the magnetic sections are being sensed in each track during a scan. Because the separation between each patterned section changes from track 57 through track 51 (shown in FIG. 6) a unique servo signal is generated for each track. One benefit of spatially modulated sections is that the servo data is inherent in the disk medium patterning. Therefore, the disk medium patterned according to the invention does not require magnetic servo data to be recorded on the disk prior to its use in a disk drive. Writing servo data on magnetic disk media requires addition time and expense in the disk manufacturing process. Further, recording servo data requires additional quality assurance testing to ensure that the servo data is readable and correctly positions a head device during scanning operation.

FIG. 9 shows an alternative servo arrangement in which servo marks are written magnetically on the disk at a position offset from the center of the data track. The amplitude of successive servo marks are measured. When the head is on track, the amplitude from the up pointing and down pointing perpendicular media cancels, resulting in no net signal. If the head is off track in either direction, a signal is detected. If the head is off track towards the outer diameter (for example), the first servo channel generates a net positive signal, followed by a negative signal. If the head is off-track towards the inner diameter, the polarity from the servo marks is reversed. The disk drive uses this information to correct the position of the write and read heads to ensure that they are on the center of the data track.

The invention, as set forth above, describes the preferred embodiment. It will be clear to one skilled in the art that there are many variations that are within the scope of this invention. For example, the patterned sections can be spatially modulated in many ways to generate servo-signals used to position and locate a read or write device near an air bearing surface of the patterned medium. Also, it is within the scope of the invention to use pre-recorded magnetic servo-data or optical servo-markers to generate servo tracking signals, either separately or in combination with spatially modulated servo signals of the current invention. Further, while it is preferred to have patterned sections, these sections may intersect or overlap.

What is claimed is:

1. A patterned magnetic recording disk having a magnetic material for recording data bits therein, said magnetic recording disk having:
   a) an inner diameter;
   b) an outer diameter;
   c) a circumference;
   d) a pattern of parallel linear channels comprising said magnetic material, said pattern being arranged along a radial direction normal to said circumference; and
   e) channel boundaries interposed between said linear channels for magnetically decoupling said channels.

2. The patterned magnetic recording disk of claim 1, wherein said linear channels have a predetermined width.

3. The patterned magnetic recording disk of claim 2, wherein said predetermined width is equal to circumferential lengths of said data bits.

4. The patterned magnetic recording disk of claim 3, wherein said data bits are selected from the group consisting of longitudinally recorded data bits and perpendicularly recorded data bits.

5. The patterned magnetic recording disk of claim 1, wherein said linear channels are photolithographically patterned linear channels.

6. The patterned magnetic recording disk of claim 1, wherein said pattern of said linear channels is subdivided into patterned sections, each of said patterned sections comprising a plurality of said linear channels arranged parallel to each other within each of said patterned sections.

7. The patterned magnetic recording disk of claim 6, wherein said patterned sections are spatially modulated such that a measured circumferential distance between said sections varies along said radial direction.

8. The patterned magnetic recording disk of claim 6, wherein said patterned sections are wedge-shaped.

9. The patterned magnetic recording disk of claim 6, wherein said patterned sections are arranged symmetrically such that circumferential distances between adjacent patterned sections are substantially equal at each radial position of said patterned magnetic recording disk.

10. The patterned magnetic recording disk of claim 9, wherein said patterned sections are arranged to form at least two concentrically positioned bands containing a plurality of said patterned sections.

11. A magnetic disk medium comprising:
   a) a disk substrate having a circumference;
   b) a magnetic layer deposited on said disk substrate;
   c) a pattern of magnetic sections in said magnetic layer, said magnetic sections comprising linear magnetic channels, said magnetic sections being spatially modulated such that a distance between said magnetic sections in a direction parallel to said circumference varies along a radial direction normal to said circumference; and
   d) a boundary material separating said magnetic sections.

12. The magnetic disk medium of claim 11, wherein said linear magnetic channels begin and end at substantially different radial positions and are capable of storing magnetic data bits.

13. The magnetic disk medium of claim 12, wherein said linear magnetic channels are separated by spacer channels interposed between said linear magnetic channels for magnetically decoupling said linear magnetic channels.

14. The magnetic disk medium of claim 13, wherein said linear magnetic channels are parallel to each other within each of said magnetic sections.

15. The magnetic disk medium of claim 11 further comprising servo marks for locating circumferential and radial positions of a pole-tip read and write device.

16. The magnetic disk medium of claim 15 wherein said servo marks are selected from the group consisting of magnetic servo marks and optical servo marks.

17. The magnetic disk medium of claim 11 wherein said disk substrate is selected from the group consisting of an aluminum-magnesium alloy with a plated nickel phosphorus coating, glass, silicon, ceramic and quartz.

18. The magnetic disk medium of claim 17 wherein said magnetic layer has a thickness ranging from 1.0 to 500 nanometers.

19. The magnetic disk medium of claim 18 wherein said magnetic layer comprises a Co alloy comprising $Cr_x$, $Fe_y$ and $Pt_z$, wherein $0 \leq x \leq 30$, $0 \leq y \leq 40$ and $0 \leq z \leq 80$ atomic percent, and $25 \leq (x+y+z) \leq 80$.

20. The magnetic disk medium of claim 11, wherein said pattern of magnetic sections comprises wedge-shaped magnetic sections.

21. A disk drive comprising:
   a) a patterned magnetic recording disk having:
      1) a circumference;
      2) a pattern of parallel linear channels having predetermined channel widths comprising a magnetic material for recording data bits therein, said pattern being arranged along a radial direction normal to said circumference;
      3) channel boundaries interposed between said linear channels for magnetically decoupling said channels;
   b) a head having a head width substantially equal to said predetermined channel widths for writing said data bits; and
   c) a control means for scanning said head over said patterned magnetic recording disk along a circumferential direction parallel to said circumference such that said head width and said predetermined channel widths are matched.

22. The disk drive of claim 21, wherein said control means for controlling said positions of said head comprises:
   a) servo marks positioned at predetermined locations on said patterned magnetic recording disk; and b) a servo positioning system comprising a reading device for reading said servo marks and positioning said head therefrom.

23. The disk drive of claim 22, wherein said servo marks are selected from the group consisting of magnetic servo marks and optical servo marks.

24. The disk drive of claim 22, wherein said reading device for reading said servo marks is said head.

25. The disk drive of claim 24, wherein said pattern is subdivided into magnetic sections that are spatially modulated such that a circumferential distance between adjacent magnetic sections varies along said radial direction.

26. The disk drive of claim 25, wherein said magnetic sections comprise servo marks.

27. The disk drive of claim 25, wherein said linear channels are substantially parallel within each of said magnetic sections.

28. The disk drive of claim 21, wherein said data bits are selected from the group consisting of longitudinally recorded data bits and perpendicularly recorded data bits.

29. The disk drive of claim 21, wherein said linear channels are photolithographically patterned linear channels.

30. A disk drive comprising:
 a) a patterned magnetic recording disk having a circumference and patterned magnetic sections comprising parallel linear channels made of a magnetic material, said patterned magnetic sections being spatially modulated such that distances measured along a circumferential direction of said patterned magnetic recording disk and between said patterned magnetic sections vary along a radial direction normal to said circumference;
 b) a head with a circumferential head width and a radial head width for writing data bits in said patterned magnetic sections; and
 c) a control means for scanning said head over said magnetic recording disk in said circumferential direction.

31. The disk drive of claim 30, wherein said control means for controlling said positions of said head comprises:
 a) servo marks positioned at predetermined locations on said patterned magnetic recording disk; and
 b) a servo positioning system comprising a reading device for reading said servo marks and positioning said head therefrom.

32. The disk drive of claim 31, wherein said servo marks are selected from the group consisting of magnetic servo marks and optical servo marks.

33. The disk drive of claim 31, wherein said reading device for reading said servo marks is said head.

34. The disk drive of claim 31, wherein said patterned magnetic sections comprise said servo marks.

35. The disk drive of claim 31, wherein said linear channels in said patterned magnetic sections extend substantially along said radial direction and wherein said linear channels have predetermined circumferential channel widths.

36. The disk drive of claim 35, wherein said circumferential head width and said circumferential channel widths are substantially matched.

37. The disk drive of claim 30, wherein said data bits are selected from the group consisting of longitudinally recorded data bits and perpendicularly recorded data bits.

38. The disk drive of claim 30, wherein said linear channels are photolithographically patterned linear channels.

* * * * *